(12) United States Patent
Schentrup

(10) Patent No.: US 9,232,078 B1
(45) Date of Patent: Jan. 5, 2016

(54) METHOD AND SYSTEM FOR DATA USAGE ACCOUNTING ACROSS MULTIPLE COMMUNICATION NETWORKS

(71) Applicant: OpenPeak Inc., Boca Raton, FL (US)

(72) Inventor: Philip Schentrup, Parkland, FL (US)

(73) Assignee: OpenPeak Inc., Boca Raton, FL (US)

( * ) Notice: Subject to any disclaimer, the term of this patent is extended or adjusted under 35 U.S.C. 154(b) by 0 days.

(21) Appl. No.: 14/658,998

(22) Filed: Mar. 16, 2015

(51) Int. Cl.
*H04M 15/00* (2006.01)
*G06Q 10/10* (2012.01)

(52) U.S. Cl.
CPC .............. *H04M 15/58* (2013.01); *G06Q 10/10* (2013.01)

(58) Field of Classification Search
CPC ..... H04M 15/58; H04M 15/16; H04M 15/34; H04M 15/41–15/56; H04M 15/60; H04M 15/64–15/781; H04M 15/8033; H04M 15/8038; H04M 15/8214–15/8235; H04M 15/83–15/866; G06Q 10/10
See application file for complete search history.

(56) References Cited

U.S. PATENT DOCUMENTS

| | | | |
|---|---|---|---|
| 6,052,709 | A | 4/2000 | Paul |
| 6,275,983 | B1 | 8/2001 | Orton et al. |
| 6,681,238 | B1 | 1/2004 | Brice, Jr. et al. |
| 7,958,245 | B2 | 6/2011 | Thomas et al. |
| 8,051,432 | B2 | 11/2011 | Dash et al. |
| 8,078,739 | B1 | 12/2011 | Somasundaram et al. |
| 8,099,541 | B2 | 1/2012 | Serebrin |
| 8,832,652 | B2 | 9/2014 | Mueller et al. |
| 8,850,424 | B2 | 9/2014 | Friedman et al. |
| 8,869,235 | B2 | 10/2014 | Qureshi et al. |
| 8,893,261 | B2 | 11/2014 | Fainkichen et al. |
| 8,893,298 | B2 | 11/2014 | Roark et al. |
| 8,924,970 | B2 | 12/2014 | Newell |
| 8,938,547 | B1 | 1/2015 | Roberge et al. |
| 8,955,068 | B1 | 2/2015 | Venkataramani et al. |
| 8,955,152 | B1 | 2/2015 | Enderwick et al. |
| 8,959,579 | B2 | 2/2015 | Barton et al. |
| 8,966,574 | B2 | 2/2015 | Kiehtreiber et al. |

(Continued)

FOREIGN PATENT DOCUMENTS

| | | |
|---|---|---|
| WO | 9705551 A1 | 2/1997 |
| WO | 2013050602 A1 | 4/2013 |

OTHER PUBLICATIONS

IBM, "Application Protection Inside an Untrusted OS," Feb. 9, 2010, 7 pages.

(Continued)

*Primary Examiner* — Mehmood B Khan

(57) ABSTRACT

A method and system for data accounting across multiple communication networks are described herein. An enterprise data session request is received from a device configured to operate on a home communication network in which the device is associated with an enterprise. A usage amount can be determined for the session request, and it can be determined that the device is associated with the enterprise. In addition, the usage amount for the session request can be attributed to the enterprise. Another enterprise data session request can be received from a second device configured to operate on a second home communication network in which the second device is also associated with the enterprise. A usage amount can be determined for the session request from the second device, and it can be determined that the second device is associated with the enterprise. The usage amount for the session request from the second device can be attributed to the enterprise such that enterprise data usage accounting for different devices operating on different networks is enabled.

14 Claims, 2 Drawing Sheets

(56) References Cited

U.S. PATENT DOCUMENTS

| | | | |
|---|---|---|---|
| 8,977,842 B1 | 3/2015 | McCorkendale et al. | |
| 8,978,110 B2 | 3/2015 | Dabbiere et al. | |
| 8,984,657 B2 | 3/2015 | Nerger et al. | |
| 8,990,116 B2 | 3/2015 | Ferino et al. | |
| 8,990,901 B2 | 3/2015 | Aravindakshan et al. | |
| 8,990,920 B2 | 3/2015 | Pontillo et al. | |
| 2002/0131404 A1 | 9/2002 | Mehta et al. | |
| 2002/0133534 A1* | 9/2002 | Forslow | H04L 12/4641 709/200 |
| 2003/0229718 A1 | 12/2003 | Tock et al. | |
| 2004/0019675 A1 | 1/2004 | Hebeler et al. | |
| 2004/0047348 A1 | 3/2004 | O'Neill et al. | |
| 2004/0128665 A1 | 7/2004 | Gouleau et al. | |
| 2004/0139170 A1 | 7/2004 | Shen et al. | |
| 2004/0210524 A1* | 10/2004 | Benenati | G06Q 20/102 705/40 |
| 2005/0120331 A1 | 6/2005 | Asare et al. | |
| 2005/0262194 A1* | 11/2005 | Mamou | G06Q 10/10 709/203 |
| 2006/0085645 A1 | 4/2006 | Bangui | |
| 2006/0121880 A1 | 6/2006 | Cowsar et al. | |
| 2006/0171402 A1* | 8/2006 | Moore | H04L 12/5692 370/401 |
| 2008/0060085 A1 | 3/2008 | Samzelius et al. | |
| 2008/0126736 A1 | 5/2008 | Heil | |
| 2008/0183604 A1* | 7/2008 | Chou | G06Q 50/32 705/30 |
| 2008/0271014 A1 | 10/2008 | Serebrin et al. | |
| 2009/0126017 A1 | 5/2009 | Chahal | |
| 2009/0132828 A1 | 5/2009 | Kiester et al. | |
| 2009/0187726 A1 | 7/2009 | Serebrin et al. | |
| 2009/0219899 A1 | 9/2009 | Dostal et al. | |
| 2010/0042990 A1 | 2/2010 | Kinder | |
| 2010/0180276 A1 | 7/2010 | Jiva | |
| 2010/0222097 A1 | 9/2010 | Gisby et al. | |
| 2011/0040607 A1 | 2/2011 | Shkedi | |
| 2011/0208838 A1 | 8/2011 | Thomas et al. | |
| 2012/0005746 A1 | 1/2012 | Wei et al. | |
| 2012/0079084 A1* | 3/2012 | Forssell | H04W 8/18 709/221 |
| 2012/0079423 A1 | 3/2012 | Bender et al. | |
| 2012/0084184 A1* | 4/2012 | Raleigh | H04M 15/7652 705/30 |
| 2012/0276867 A1* | 11/2012 | McNamee | H04L 12/1407 455/406 |
| 2012/0302204 A1* | 11/2012 | Gupta | H04M 15/44 455/406 |
| 2012/0324057 A1 | 12/2012 | Macris | |
| 2013/0040602 A1* | 2/2013 | Piccinini | G06Q 30/04 455/406 |
| 2013/0091543 A1 | 4/2013 | Wade | |
| 2013/0091557 A1 | 4/2013 | Gurrapu | |
| 2013/0226669 A1 | 8/2013 | Chiang et al. | |
| 2013/0247147 A1 | 9/2013 | Pontillo et al. | |
| 2013/0260730 A1 | 10/2013 | Toy et al. | |
| 2013/0316703 A1 | 11/2013 | Girard et al. | |
| 2014/0006237 A1 | 1/2014 | Chiang et al. | |
| 2014/0047532 A1 | 2/2014 | Sowatskey | |
| 2014/0208397 A1 | 7/2014 | Peterson | |
| 2014/0230008 A1 | 8/2014 | Feroz et al. | |
| 2014/0230011 A1 | 8/2014 | Drewry et al. | |
| 2014/0250505 A1 | 9/2014 | Kim et al. | |
| 2014/0279454 A1* | 9/2014 | Raman | H04L 63/08 705/40 |
| 2014/0280934 A1 | 9/2014 | Reagan et al. | |
| 2014/0280955 A1 | 9/2014 | Stuntebeck et al. | |
| 2014/0282828 A1 | 9/2014 | Stunebeck | |
| 2014/0282829 A1 | 9/2014 | Dabbiere et al. | |
| 2014/0282846 A1 | 9/2014 | DeWeese et al. | |
| 2014/0282869 A1 | 9/2014 | Dabbiere | |
| 2014/0282894 A1 | 9/2014 | Manton | |
| 2014/0282897 A1 | 9/2014 | Stuntebeck | |
| 2014/0282929 A1 | 9/2014 | Tse | |
| 2014/0317679 A1 | 10/2014 | Wade et al. | |
| 2015/0033324 A1 | 1/2015 | Fainkichen et al. | |
| 2015/0109967 A1* | 4/2015 | Hogan | H04L 41/5051 370/259 |

OTHER PUBLICATIONS

Non-Final Office Action for U.S. Appl. No. 14/205,686, mailed Dec. 5, 2014, 12 pages.

Non-Final Office Action for U.S. Appl. No. 14/205,661, mailed Dec. 22, 2014, 12 pages.

International Search Report and Written Opinion for International Application No. PCT /US2014/060657, mailed Jan. 29, 2015, 10 pages.

'Multifaceted Resource Management for Dealing with Heterogeneous Workloads in Virtualized Data Centers', 11th IEEE/ACM International Conference on Grid Computing, 2010 pp. 25-32. See abstract and sections I-II.

Extended European Search Report and Search Opinion for European Application No. 12839583.7, mailed Apr. 9, 2015, 6 pages.

International Search Report and Written Opinion for International Application No. PCT/US2014/060838, mailed Apr. 23, 2015, 15 pages.

Amendment and Reply for U.S. Appl. No. 14/205,686, filed May 1, 2015, 11 pages.

Amendment and Reply for U.S. Appl. No. 14/205,661, filed May 1, 2015, 10 pages.

Non-Final Office Action for U.S. Appl. No. 14/641,795, dated May 15, 2015, 16 pages.

Non-Final Office Action for U.S. Appl. No. 14/608,662, mailed Jun. 4, 2015, 19 pages.

Non-Final Office Action for U.S. Appl. No. 14/573,601, mailed Apr. 24, 2015, 18 pages.

Jack Madden, "Good Technology will soon let you bundle mobile data with their email app", Brian Madden, dated Jul. 31, 2014, 2 pages.

Jack Madden, "After mobile app management, the next step for BYOD can be split phone numbers and split billing", Brian Madden, dated Jan. 27, 2015, 2 pages.

U.S. Appl. No. 14/608,662, filed Jan. 29, 2015, 42 pages.
U.S. Appl. No. 14/641,795, filed Mar. 9, 2015, 61 pages.
U.S. Appl. No. 14/615,799, filed Feb. 6, 2015, 50 pages.
U.S. Appl. No. 14/573,601, filed Dec. 17, 2014, 30 pages.
U.S. Appl. No. 14/710,208, filed May 12, 2015, 80 pages.

Amendment and Reply and Declaration in Support of Amendment for U.S. Appl. No. 14/608,662, filed Sep. 4, 2015, 20 pages.

Amendment and Reply and Declaration in Support of Amendment for U.S. Appl. No. 14/615,799, filed Sep. 9, 2015, 20 pages.

* cited by examiner

METHOD AND SYSTEM FOR DATA USAGE ACCOUNTING ACROSS MULTIPLE COMMUNICATION NETWORKS

FIELD OF TECHNOLOGY

The present description relates to methods and systems for data usage accounting and more particularly, to methods and systems for data usage accounting for computing devices operating on disparate communication networks.

BACKGROUND

In an effort to increase productivity, many employers allow their workers to conduct business related to the employer on their personal mobile devices. In some cases, employers also provide some of their employees with company-issued mobile devices. In either arrangement, an employer understands that a single device may include sensitive data related to that employer in addition to data that is personal to the employee. Several advances have been made in an effort to protect an employer's data in these circumstances. For example, OpenPeak Inc. of Boca Raton, Fla. has developed solutions that enable a mobile device to include both enterprise and personal data but that isolate the enterprise data from the personal data. As part of these solutions, an employee may download secure applications that may be used to conduct transactions related to the enterprise.

Because the employee's device may include both personal and secure applications, it may be desirable to bifurcate the process of data usage accounting. In particular, the employer may wish to receive an accounting of the data usage associated with the secure applications that have been installed on the employee's device on behalf of the employer. This accounting, however, needs to be separate from data accounting that may be attributable to unsecure applications that the employee may have installed for personal use. An additional complication is that the employee devices typically operate over multiple communication networks operated by different wireless carriers.

SUMMARY

A method for data usage accounting across multiple communication networks is described herein. An enterprise data session request from a first computing device that is configured to operate on a first home communication network can be received in which the first computing device is associated with a first enterprise. A data usage amount for the enterprise data session request can be determined, and it can be determined that the first computing device is associated with the first enterprise. The data usage amount for the enterprise data session request can then be attributed to the first enterprise. Another enterprise data session request from a second computing device that is configured to operate on a second home communication network can be received in which the second computing device is also associated with the first enterprise. A data usage amount for the enterprise data session request from the second computing device can be determined, and it can be determined that the second computing device is associated with the first enterprise. The data usage amount for the enterprise data session request from the second computing device can be attributed to the first enterprise such that enterprise data usage accounting for different computing devices operating on different networks is enabled.

In one embodiment, receiving the enterprise data session request from the first computing device can include receiving the enterprise data session from the first computing device over the first home communication network. In addition, receiving the enterprise data session request from the second computing device can include receiving the enterprise data session from the second computing device over the second home communication network. In another embodiment, receiving the enterprise data session request from the first computing device can include receiving the enterprise data session from the first computing device over a roaming communication network. Further, receiving the enterprise data session request from the second computing device can include receiving the enterprise data session from the second computing device over a roaming communication network. As an example, the enterprise data session request received from the first computing device can be a redirected data session request originating from a secure application installed on the first computing device.

Another enterprise data session request from a third computing device that is configured to operate on the second home communication network can be received in which the third computing device is associated with a second enterprise. A data usage amount for the enterprise data session request from the third computing device can be determined, and it can be determined that the third computing device is associated with the second enterprise. The data usage amount for the enterprise data session request from the third computing device can be attributed to the second enterprise.

As an example, attributing the data usage amount for the enterprise data session request from the first computing device to the first enterprise can include accessing a predetermined usage rate for the first enterprise based on the first home communication network. As another example, the enterprise data session request received from the first computing device can be a zero-rated data session request such that an end user of the first computing device is not responsible for the data usage from the data session request. Moreover, a connection can be established with an external entity based on the enterprise data session request from the first computing device for data exchange between the first computing device and the external entity. Another connection can be established with a second external entity based on the enterprise data session request from the second computing device for data exchange between the second computing device and the second external entity.

Another method of data usage accounting is described herein. In this method, a first secure data session request can be received from a first computing device that includes both secure applications and unsecure applications over a first home communication network for the first computing device. The first secure data session request can be from one of the secure applications of the first computing device, and such secure data session requests from the first computing device may be restricted to only the secure applications of the first computing device. A second secure data session request can be received from a second computing device that includes both secure application and unsecure applications over a second home communication network for the second computing device. The second secure data session request can be from one of the secure applications of the second computing device, and such secure data session requests from the second computing device may be restricted to only the secure applications of the second computing device. A connection with a first external entity can be facilitated in response to the first secure data session request, and a connection with a second external entity can be facilitated in response to the second secure data session request. A first data usage amount based on the connection with the first external entity can be determined on behalf of a first enterprise. The first computing device can be assigned to the first enterprise such that the first enterprise is responsible for the first data usage amount. In addition, a second data usage amount based on the connection with the second external entity can be determined on behalf of a second enterprise. The second computing device can be assigned to the second enterprise such that the second enterprise is responsible for the second data usage amount.

In this scenario, the data session requests that are being monitored here may only be initiated through secure applications. As such, the data session requests from unsecure applications or applications not authorized, controlled or managed by or otherwise associated with an enterprise may not be subject to the monitoring of data usage amounts, including any redirections that are necessary to conduct such monitoring.

In one embodiment, the first secure data session request is redirected through the secure application of the first computing device. Also, receiving the first secure data session request from the first computing device can include receiving a certificate that includes a management identifier that can tie or link the first computing device to the first enterprise. In another embodiment, the first secure data session request from the first computing device can be a zero-rated data session request such that an end user operating the computing device is not responsible for the first data usage amount.

A data usage rate assigned to the first enterprise for the first home communication network can also be determined. A third secure data session request can be received from the first computing device over a roaming communication network for the first computing device. A data usage rate assigned to the first enterprise for the roaming communication network can also be determined in which the data usage rate for the roaming communication network may be different from the data usage rate of the first home communication network. It can also be determined that the first secure data session request from the first computing device is over the first home communication network by determining an Internet Protocol (IP) address of the first home communication network. It can also be determined that the third secure data session request from the first computing device is over the roaming communication network by determining an IP address of the roaming communication network.

A data usage accounting system is also described herein. The system can include an interface that may be configured to exchange data with at least a first communication network and a second communications network. The system can also include an accounting server that may be communicatively coupled to the interface. The interface may be further configured to receive a first secure data session request from a first computing device over the first communication network and a second secure data session request from a second computing device over the second communication network. The accounting server can be configured to determine a first data usage amount for the first secure data session request and determine a second data usage amount for the second secure data session request. The accounting server can also be configured to generate a first data record for the first data usage amount and a second data record for the second data usage amount. The first data record can include a first enterprise identifier such that a first enterprise responsible for the first secure data session request may be tied to the first data usage amount, and the second data record includes a second enterprise identifier such that a second enterprise responsible for the second secure data session request may be tied to the second data usage amount. As an example, an enterprise identifier may be a direct identifier or an indirect identifier in the form of a reference that can be mapped to determine the actual identity of the enterprise.

In one embodiment, the accounting server can be further configured to establish a connection with a first external entity in response to the first secure data session request to enable data exchange between the first external entity and the first computing device. The accounting server can also be configured to establish a connection with a second external entity in response to the second secure data session request to enable data exchange between the second external entity and the second computing device.

The system can further include an attribution server that can be communicatively coupled to the accounting server. The attribution server can be configured to receive the first data record and the second data record from the accounting server and to generate a report for the first enterprise that can include the first data usage amount for the first secure data session request and a report for the second enterprise that can include the second data usage amount for the second secure data session request. Usage charges may also be part of this report.

In another embodiment, the first data record can further include a network indicator that identifies the first communication network as a home communication network for the first computing device or a roaming communication network for the first computing device. The network indicator can be a direct indicator as to the home or roaming status of the first network or a reference that can be mapped to determine whether the first network is a home or roaming network. Accordingly, the attribution server can be further configured to generate the report for the first enterprise to include an indication that the first data usage amount was accrued on the first communication network as a roaming communication network.

As an example, the first secure data session request from the first computing device over the first communication network can be a zero-rated request from the first communication network arranged to prevent attribution of the request to an end-user of the first computing device. As another example, the accounting server can be further configured to receive a certificate from the first computing device as part of the first secure data session request that includes the first enterprise identifier. The interface may also be further configured to receive the first secure data session request from a secure application installed on the first computing device and the second secure data session request from a secure application installed on the second computing device. As such, the interface may be configured to only receive secure data session requests from secure applications installed on computing devices in communication with the interface. That is, the interface should not receive data session requests from personal applications/programs that are associated with the user/owner of the computing device.

A communication system is also described herein. The system can include an interface that can be configured to receive data session requests from and exchange data with multiple computing devices operating on different communication networks. The exchanged data may be zero-rated by the communication networks based on the data session requests originating from secure applications installed on the computing devices. The system can also include an accounting server that can be communicatively coupled to the interface. The accounting server can be configured to generate data records based on the data exchanged between the computing devices and external entities to which the data sessions requests are directed. The data records may include data usage amounts for the data exchanges and enterprise identifiers in which the enterprise identifiers can tie or link the data exchanges to enterprises responsible for the secure applications installed on the computing devices.

The accounting server can be further configured to establish connections with the external entities in response to the incoming data session requests to enable the data exchange. As an example, the data record can further include a network identifier that can enable distinctions to be made between data session requests over home communication networks for the computing devices and data session requests over roaming communication networks for the computing devices.

The system can further include an attribution server that can be communicatively coupled to the accounting server. The attribution server can be configured to generate reports for the enterprises that show cumulative totals of the data usage amounts accrued for the data exchanges. The system can also include a device management server that can be communicatively coupled to the attribution server. The device management server can be configured to map the enterprise identifiers to the enterprises to enable the attribution server to generate the reports for the enterprises.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
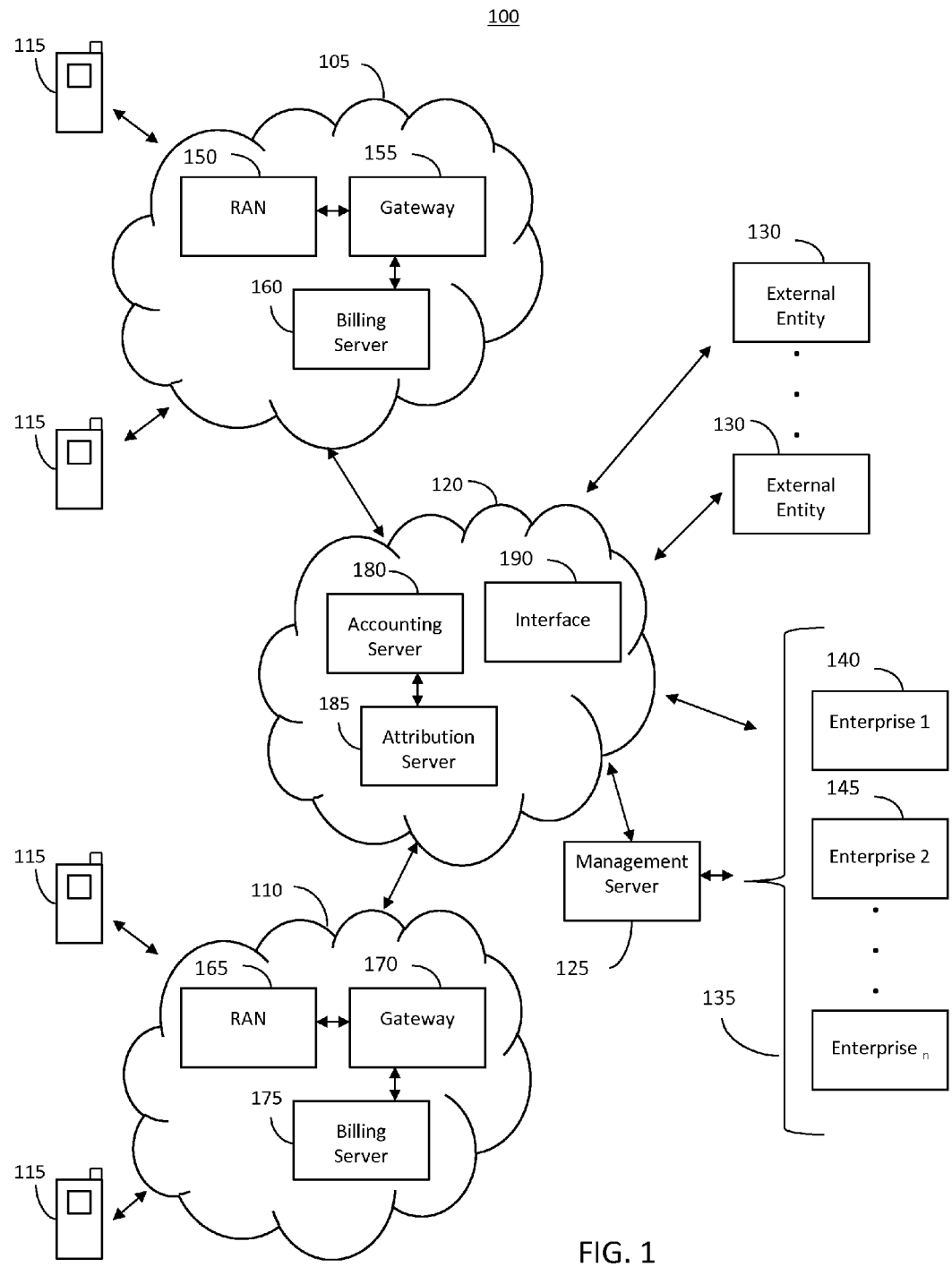
FIG. 1 illustrates an example of a block diagram of a data usage accounting system.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described. The word "among," as it is used throughout this description, should not necessarily be interpreted as requiring exchanges or interaction among three or more applications, irrespective of grammar rules. The word "a" is not necessarily limited to a singular instance of something, as it may mean one or more.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged (directly or indirectly) between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The term "computer readable storage medium" is defined as one or more components that are configured to store instructions that are to be executed by one or more processing units.

An "application" is defined as a program or programs that perform one or more particular tasks on a computing device. Examples of an application include programs that may present a user interface for interaction with a user or that may run in the background of an operating environment that may not present a user interface while in the background. The term "operating system" is defined as a collection of software components that directs a computing device's operations, including controlling and scheduling the execution of other programs and managing storage, input/output and communication resources. A "processing unit" or "processor" is defined as one or more components that execute sets of instructions, and the components may be disparate parts or part of a whole unit and may not necessarily be located in the same physical location.

The terms "memory," "memory element" or "repository" are defined as one or more components that are configured to store data, either on a temporary or persistent basis. The term "shared memory" is memory, a memory element or a repository that is accessible (directly or indirectly) by two or more applications or other processes. An "interface" is defined as a component or a group of components that enable(s) a device to communicate with one or more different devices, whether through hard-wired connections, wireless connections or a combination of both. An "input/output device" is defined as a device that is configured to at least receive input from a user or a machine that is intended to cause some action or other effect on a component with which the input device is associated. A "display" is defined as an apparatus that presents information in visual form and may or may not receive input through a touch screen. An "enterprise" is defined as an organization formed for the purpose of conducting business—whether for profit or not—and that has individuals associated with it to further its goals.

The term "file system" is defined as an abstraction that is used to organize, store and retrieve data. The term "secure application" is defined as an application that has been modified or enhanced from its original form to restrict communications between the application and unauthorized programs, applications or devices and to restrict operation of the application based on policy or to alter, augment or add features associated with the operation of the application (or any combination thereof) or—in the case of the application not being modified—an application that is part of a secure workspace that is protected from data exchanges with applications that are part of a personal or an unsecure workspace. A "target application" is defined as an application that has been selected for conversion into a secure application. An "unsecure application" is defined as an application that has not undergone the modification required to convert the application into a secure application and, as such, is unable to obtain data from a secure application in view of an obfuscation scheme employed by that secure application or is an application that is not part of a secure workspace and is restricted from accessing data from the secure workspace.

The term "personal workspace" is defined as a workspace, profile or partition that is configured to contain the personal content and unsecure applications or other unsecure programs associated with a user of a computing device on which the personal workspace sits. The term "secure workspace" is defined as a workspace, profile or partition that is configured to contain secure content, secure applications and other secure programs and requires some form of authentication to be accessed.

The term "content provider" is defined as a site that offers data for consumption by a computing device. The term "system service" is defined as an application or a set of applications on a computing device that offer one or more features for access by an unsecure application or a secure application. A "secure connection" is defined as a connection in which at least some portion of the data that is exchanged over the connection is encrypted or otherwise obfuscated from unauthorized parties, entities or processes. To "consume data" means to receive data from a source, transmit data to a recipient or both. An "external network entity" means an entity—such as a component or a service—that is part of a network that is external to or located remotely from a computing device. An "external entity" is defined as an entity to which an application wishes to establish a connection. A "final endpoint" or "final destination" is the external entity with which an application or process intends to establish a connection based on a data request.

The term "initiate" is defined as to begin or start. The terms "authenticate," "authenticates," "authenticating," authenticated" or "authentication" are defined as a technique, process or series of steps in which an entity or device is verified or confirmed for access to some component, process, destination or data. An "authentication package" is defined as one or more items that are configured to be presented for the authentication of some component, process or data. An "authentication server" is defined as a server that is configured to accept an authentication package and—whether solely or in conjunction with another component—perform an authentication based at least on the authentication package. The phrase "uniquely associated with" is defined as an exclusive connection, relationship, link or affiliation between or among two or more objects, components or processes, such as a private key that is exclusively assigned to a single computing device. The terms "attribute" or "attributing" are defined as assigning, designating or determining responsibility. The terms "facilitate" or "facilitating" are defined as assisting or overseeing some act, event or state, including on a partial basis or by assuming complete control.

A "profile" is defined as a collection of data that is configured to provide a computing device with instructions for performing one or more tasks. To "establish a data session" or "establish a connection" means to cause, facilitate or oversee the set-up of a connection or link to the point that data exchange may occur between or among any number of components, objects or processes. A "home communication network" is a communication network that serves as the primary provider of communications for a computing device from the perspective of that device based on an existing agreement between a user of that device and an operator of the communication network. A "roaming communication network" is a communication network that provides communications to a computing device when the computing device is outside the range of its home communication network or the home communication network is otherwise inoperable.

An "enterprise data session request" is a data session request that originates from an application, secure application, unsecure application, program or object that is controlled, sanctioned, managed or otherwise authorized by an enterprise and for which the enterprise wishes to segregate attribution of its data usage to itself or another related party. A "secure data session request" is a data session request that originates from a secure application or some other application in which the application is selectively isolated from communications with other applications.

As explained earlier, solutions have been developed that enable a mobile device to include both personal and enterprise data. Accordingly, it may be useful to segregate data usage accounting associated with the enterprise side from usage associated with the personal space. This process can enable an enterprise to determine how much data that is consumed by the mobile device is the responsibility of the enterprise. Such a solution, however, should account for the different communication networks over which the devices operate and the multitude of enterprises that may be involved.

In view of this need, a method and system for data usage accounting across multiple communication networks is described herein. An enterprise data session request can be received from a first computing device that is configured to operate on a first home communication network in which the first computing device is associated with a first enterprise. A data usage amount can be determined for the enterprise data session request, and it can be determined that the first computing device is associated with the first enterprise. In addition, the data usage amount for the enterprise data session request can be attributed to the first enterprise. Another enterprise data session request can be received from a second computing device that is configured to operate on a second home communication network in which the second computing device is also associated with the first enterprise. A data usage amount can be determined for the enterprise data session request from the second computing device, and it can be determined that the second computing device is associated with the first enterprise. The data usage amount for the enterprise data session request from the second computing device can be attributed to the first enterprise such that enterprise data usage accounting for different computing devices operating on different networks is enabled.

Through this arrangement, any number of enterprises may be able to track data usage that is directly attributable to their applications installed on the devices of their employees or associates. This solution may be realized even if the employees' devices operate on disparate communication networks.

Referring to FIG. 1, an example of a data usage accounting system 100 is shown. The system 100 can include a first communication network 105 and a second communication network 110. As an example, the first communication network 105 can be a network operated by a wireless carrier in which a plurality of computing devices 115 may be registered with the network 105. Also as an example, the second communication network 110 can be a network operated by a different wireless carrier in which a plurality of computing devices 115 may be registered with the network 110. An end-user of a computing device 115 may enter into an agreement with a wireless carrier to access communication services from, for example, the first communication network 105. In this case, the first network 105 may serve as the home communication network for that device 115. Similarly, the second communication network 110 may serve as the home communication network for multiple computing devices 115. If the first network 105 is the home network for a device 115 and the device 115 is outside the range of the first network 105 or the network 105 is inoperable, the second network 110 may serve as a roaming communication network for the device 115. This common feature may ensure uninterrupted service for the device 115. In some cases, different usage or billing rates may apply when the device 115 relies on a roaming network for service.

The system 100 can also include one or more central platforms 120, which may be made up of one or more different networks and/or components, and one or more management servers 125. The management server 125 may be part of the central platform 120 or may be a separate component. Both the first network 105 and the second network 110 may be communicatively coupled to the central platform 120. The system 100 may also include one or more external entities 130, which may be communicatively coupled to the central platform 120. A first enterprise node 140 and a second enterprise node 145 may be part of the system 100, and both nodes may be communicatively coupled to the central platform 120 and the management server 125.

The first communication network 105 can include a radio access network (RAN) 150, a gateway 155 and a billing server 160, while the second network 110 can similarly include a RAN 165, a gateway 170 and a billing server 175. In one embodiment, the central platform 120 may include one or more accounting servers 180 and one or more attribution servers 185. The central platform 120 may also include any number of interfaces 190 to enable communications with the first network 105, the second network 110, the external entities 130, the enterprise nodes and any other relevant components or systems. These elements may include other components, in addition to (or in lieu of) those pictured here, to facilitate the processes described herein, as one skilled in the art may appreciate.

As explained earlier, some enterprises may have employees, contractors or associates who operate computing devices 115, and these devices 115 may have data or programs on them that are related to the enterprises' business. For example, a number of these devices 115 may include secure applications installed on them, and these secure applications may be authorized by the first enterprise to be used in conjunction with the resources offered by the first enterprise, such as back-end components. Such a device 115 may also be owned by the end-user, and the device 115 may have unsecure or personal applications installed on it for the user's personal use. In view of the mixing of personal and enterprise data on the device 115, the first enterprise may wish to register for an isolated billing scheme in which data that is attributable to the services and programs that it authorizes or requires to be on the device 115 is billed to the first enterprise but not the user of the device 115. This solution is sometimes referred to as a split-billing or dual-billing arrangement. A second enterprise may also wish to participate in such a program, and accordingly, the system 100 can be set up to accommodate any number of enterprises. In addition, because the users may be operating their own devices 115 with enterprise data on them, the solution presented herein should be able to accommodate the various networks on which these devices 115 operate.

In some cases, these computing devices 115 may be managed computing devices, meaning that at least some part of their operation or configuration may be managed by a management entity associated with (or part of) the enterprise with which the device is related. As an example, an administrator may push certain applications or settings, such as in the form of a bundle, to a managed device 115. As another example, the administrator may cause certain actions to be taken on the managed device 115, like the remote wiping of sensitive data or enforcing certain security features to be enabled on the device 115. The management of these devices 115 may be facilitated by the management server 125, and any number of enterprises may register for this service. The enterprises that register may have their own networks or other communication infrastructure tied into the management server 125. The network or infrastructure of the enterprise that enables this relationship with the management server 125 may be referred to as an enterprise node, examples of which are shown in FIG. 1. These enterprise nodes may also be communicatively coupled to the central platform 120.

As part of this arrangement, the managed devices 115 may be assigned one or more identifiers that, for example, uniquely identify the devices 115 and the enterprise (or enterprise node) to which they are assigned. For example, the managed computing devices 115 may be assigned managed device instance (MDI) keys that uniquely identify the device 115 and node keys that identify the enterprise node. Those skilled in the art will appreciate that other techniques or solutions may be employed for this purpose. Additional information on managed device systems and related methods of operation may be found in U.S. Pat. No. 8,745,213, issued on Jun. 3, 2014, which is herein incorporated by reference.

Referring once again to the first communication network 105, the RAN 150 may facilitate communications with the computing devices 115, and the gateway 155 may selectively direct data session requests from the devices 115 to the central platform 120. The billing server 160 may determine which party is responsible for a particular data session based on where the data session is being directed. In some cases, the data session requests may be directed to the accounting server 180, which can establish a connection with an appropriate external entity 130. In addition, the accounting server 180 may work in tandem with the attribution server 185 to determine which enterprise may be responsible for the billing for a particular data session. The RAN 165, gateway 170 and billing server 175 of the second network 110 may function in a similar fashion in that data session requests from the devices 115 assigned to this network 110 may be forwarded to the accounting server 180 and on to the relevant external entity 130. The attribution server 185 may also take steps to determine which enterprise is responsible for data sessions that originate through the second network 110. Additional information on this system 100 will be presented below.

Figure 2:
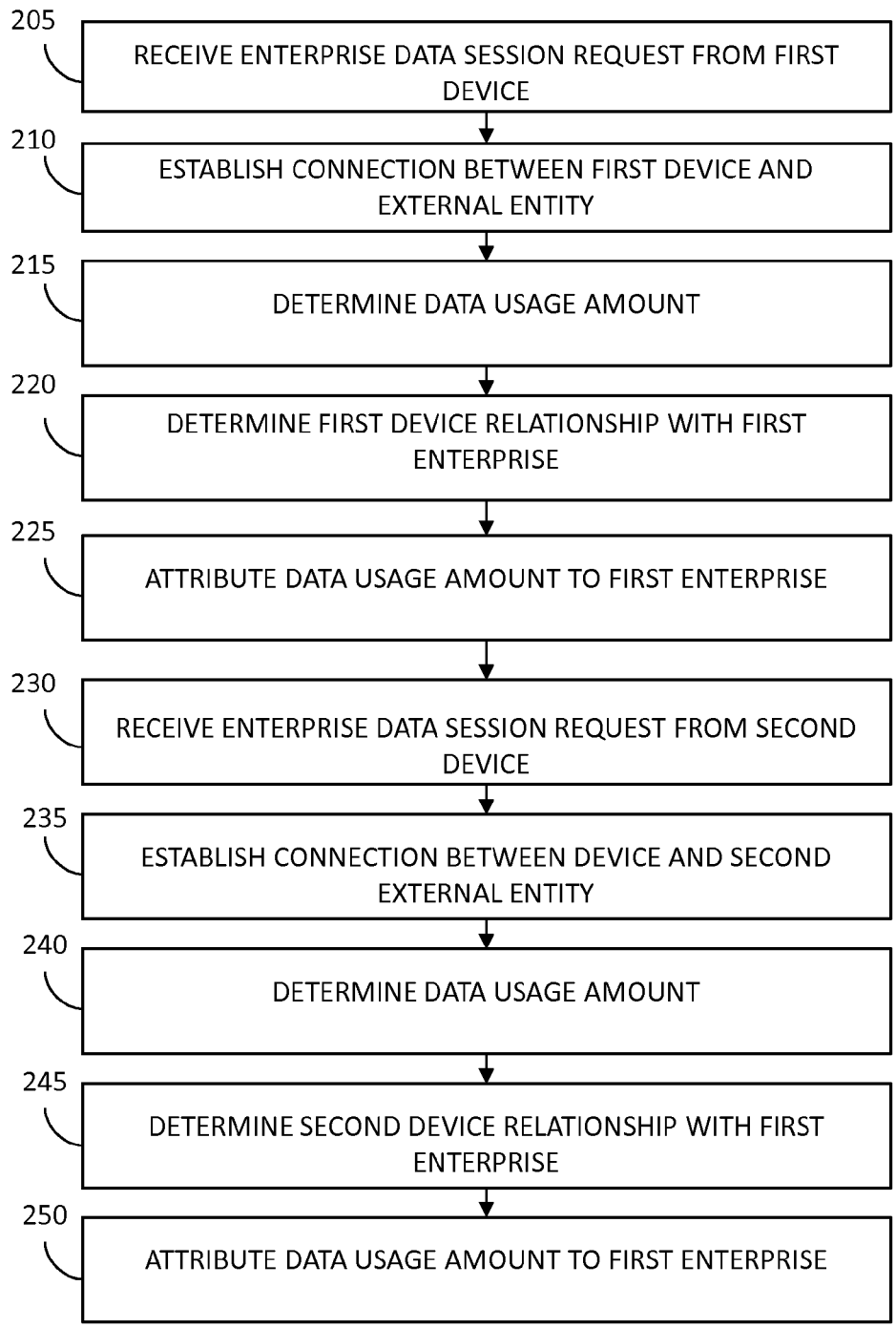
FIG. 2 illustrates an example of a method of data usage accounting across multiple communication networks.

Referring to FIG. 2, an example of a method 200 of data usage accounting across multiple communication networks is shown. The method 200, however, may include additional or even fewer steps or processes in comparison to what is illustrated in FIG. 2. Moreover, the method 200 is not necessarily limited to the chronological order that is shown in FIG. 2. In describing the method 200, reference may be made to FIG. 1, although it is understood that the method 200 may be practiced with any other suitable systems and components and may take advantage of other suitable processes.

At step 205, an enterprise data session request can be received from a first computing device that is configured to operate on a first communication network in which the first device is associated with a first enterprise. At step 210, a connection can be established for data exchange between the first device and an external entity based on the enterprise data session request from the first device. At step 215, a data usage amount can be determined for the enterprise data session request, and it can be determined that the first device is associated with the first enterprise, as shown at step 220. At step 225, the data usage amount for the enterprise data session request can be attributed to the first enterprise.

At step 230, another enterprise data session request can be received from a second computing device that is configured to operate on a second communication network in which the second device is also associated with the first enterprise. At step 235, another connection can be established with a second external entity for data exchange between the second device and the second external entity based on the enterprise data session request from the second device. A data usage amount for the enterprise data session request from the second device can be determined, as shown at step 240, and it can be determined that the second device is also associated with the first enterprise, as shown at step 245. At step 250, the data usage amount for the enterprise data session request from the second device can be attributed to the first enterprise.

Consider the following example. A user may be associated with a first enterprise, such as being an employee of the first enterprise. The first enterprise may operate or control a first enterprise node 140, which is communicatively coupled with the management server 125 and the central platform 120. In addition, the user may own the first computing device 115, which is registered with the first communication network 105, making the first network 105 the home network for the first computing device 115. As another example, the first enterprise may own the first computing device 115 and may assign it to the user. In either arrangement, the first computing device 115 may include programs and data associated with the first enterprise and the user, on a personal basis. For example, the first enterprise may have the first device 115 provisioned with one or more enterprise applications and settings, and the first device 115 may have personal content and programs of the user stored on it.

The first enterprise may wish to protect its data from the user's personal material, and as such, the data associated with the first enterprise may be isolated from the user's personal data. As part of this solution, the first enterprise may have one or more secure applications installed on the first device. A secure application, as is known in the art, is an application that has been modified to cause a secure framework or layer to selectively isolate and manipulate the calls of the original code of the application. Examples of such technology and additional related description can be found in U.S. Pat. No. 8,695,060, issued on Apr. 8, 2014; U.S. patent application Ser. No. 14/614,866, filed on Feb. 5, 2015; U.S. Patent Application No. 62/033,142, filed on Aug. 5, 2014; U.S. patent application Ser. No. 14/205,661, filed on Mar. 12, 2014; U.S. patent application Ser. No. 14/205,686, filed on Mar. 12, 2014; and U.S. Patent Application No. 62/119,586, filed on Feb. 23, 2015, each of which is herein incorporated by reference. Although an example of an enterprise data session request originating from a secure application will be presented here, the principles described herein apply to any application/program associated with an enterprise in which the enterprise wishes to have data usage of the application/program attributed to the enterprise.

The user may eventually initiate a data session request through a secure application. Because the data session request originates from a secure application that is associated with the enterprise, the data session request may be referred to as an enterprise data session request. This term may apply to any data session request that is initiated through an application/program associated with the enterprise in which the enterprise wishes to be responsible for any data usage charges. In conventional arrangements, the request may be facilitated through the operating system of the computing device 115 and, in some cases, system services, like a media player of the device 115. In this case, however, the data session request may be redirected to return to the secure application, and the secure application may initiate the connection with the external entity that is to provide the desired content/data.

For example, the initial request through the secure application may be altered to cause the redirection back to the originating secure application from the conventional system. In addition, the secure application may initiate a connection with the accounting server 180 of the central platform 120, which can be facilitated by the first communication network 105. Once the connection between the secure application of the computing device 115 and the accounting server 180 is established, the secure application may provide the accounting server 180 with the location of the requested external entity 130. In response, the accounting server 180 can initiate and establish a connection with the appropriate external entity 130 to enable data exchange between the external entity 130 and the secure application of the device 115. Additional information on the redirection of data requests can be found in U.S. Pat. No. 8,938,547, issued on Jan. 20, 2015; U.S. patent application Ser. No. 14/573,601, filed on Dec. 17, 2014; U.S. patent application Ser. No. 14/608,662, filed on Jan. 29, 2015; U.S. patent application Ser. No. 14/615,799, filed on Feb. 6, 2015; and U.S. patent application Ser. No. 14/641,795, filed on Mar. 9, 2015, each of which is herein incorporated by reference.

Because the data session request originating from the secure application has been redirected to the accounting server 180, which can then establish the connection with the appropriate external entity 130, the accounting server 180 may determine a data usage amount associated with the session. Accordingly, when the session is terminated, the accounting server 180 can generate a data record that reflects the data usage amount for the session and can send the data record to the attribution server 185. The accounting server 180 may generate the data record at any suitable time, including after each data session or on a periodic basis, such as based on a number of sessions or a predetermined time period. Additional information may be part of the data record, as will be explained below.

As part of being a managed device, the computing device 115 may be provisioned with a certificate, which can be signed by a trusted authority, such as one that operates or manages the central platform 120. In one arrangement, the certificate may be shared by other secure applications or other applications that are associated with the enterprise and that are installed on the computing device 115. The certificate may be sent to the accounting server 180 when the secure application initiates the connection with the accounting server 180, which can be used to authenticate the requesting computing device 115. As previously mentioned, the computing device 115 may be provisioned with an MDI key that uniquely identifies the computing device 115 and with a node key, which can identify the enterprise with which the computing device 115 is associated. As an example, the MDI key and the node key may be referencing information that is part of the certificate sent to the accounting server 180. As such, the accounting server may include this identifying information as part of the data record that it generates and sends to the attribution server 185. One skilled in the art will appreciate that other forms of identifying information may be used in place of or in addition to the MDI key and/or the node key. This skilled artisan will also appreciate that other forms of authentication, other than a certificate, may be used in this arrangement.

In another arrangement, the accounting server 180 may obtain the identity of the first communication network 105, such as the Internet Protocol (IP) address of the first network 105. This information may also be part of the data record that is provided to the attribution server 185.

Other forms of information may be part of the data record. For example, the data record may include the name or an identification of the application requesting the data session, an identification or type of the requesting device 115, the home network or carrier of the device 115, data plan tiers that apply to the device 115 or whether the device 115 is a personal or business device.

Once the attribution server 185 receives the data record, it may contact the management server 125 and may provide the management server 125 with the identifying information that it obtains from the data record, such as the MDI key and the node key. The management server 125 may map the (referencing) identifying information to its database(s) and can provide the attribution server 185 with the identities of the computing device 115 and the first enterprise. The attribution server 185 may also map the data usage amount to a predetermined billing database to determine a billing or attribution amount that corresponds to the data usage amount. The identity of the originating network may also be provided to the management server 125, which can determine whether the network is a home or roaming network.

At this point, the attribution server 185 may then generate a report that can show the billing or attribution amount for the requesting computing device 115 for the first enterprise and can forward this to the first enterprise node 140 or some other suitable entity. The report may include such information related to other data session requests from the computing device 115 or from other computing devices 115 associated with the first enterprise. The reports may be generated at any suitable time. Accordingly, the first enterprise may receive a report that accurately reflects the data usage (and a corresponding billing amount) for which it is directly responsible in view of the data requests being initiated from applications/programs for which it is responsible. Thus, the user of the computing device 115 may avoid responsibility for data usage originating from his/her employer's applications/programs on his/her computing device 115.

In some cases, a user may own or be assigned multiple computing devices 115. In such an arrangement, different data records and different reports for the devices 115 may be generated in accordance with the description above. Alternatively, a single data record or report may be created, and the different devices 115 may be distinguished from one another in the record or report.

Although the accounting server 180, the attribution server 185 and the management server 125 are presented as separate components, the description herein is not so limited. In particular, the accounting server 180 can be configured to perform the functions/features of the attribution server 185 and/or the management server 125, such that all three components may be considered a single unit. As another example, the attribution server 185 may be configured to store data that may normally reside with the management server 125, thereby obviating the need for the attribution server 185 to communicate with the management server 125. Of course, other combinations are applicable here, as one skilled in the art will appreciate. Moreover, instead of using referencing identifying information in the certificate, the actual identities of the computing device 115 and the responsible enterprise may be included in the certificate.

As explained above, the data session request from the secure application (or other enterprise application) may be redirected to the accounting server 180, which can be facilitated by the first communication network 105. As an example, the first communication network 105 may be configured to forward the data session request to the accounting server 180 based on the addressing information contained in the request, such as the IP address of the accounting server 180. In one embodiment, the gateway 155 may be configured to generate a data record based on the data session and to forward the data record to the billing server 160. In a conventional arrangement, the user of the computing device 115 would be responsible for the data usage. In this case, however, the data session directed to the accounting server 180 may be a zero-rated data session request. A zero-rated data session is a session in which the user (or owner) of the computing device 115 is to not be billed for the session, with responsibility for the usage charges being directed to another entity. Examples of an entity that would be responsible for such a session include the operator of the central platform 120, the management server 125 or any other suitable component. Thus, as an example, the billing server 160 may generate a report that includes the usage amount and any applicable charges for the amount for the operator of the central platform 120.

In this example, the operator of the central platform 120 may then be responsible to the operator of the first network 105 for the charges related to the enterprise data sessions on behalf of the user of the computing device 115 and the enterprise associated with the device 115. Any charges that the operator of the central platform 120 incurs from the zero-rated billing scheme set in the multiple networks supporting the computing devices 115, however, may be offset by the corresponding attribution of data usage charges to the different enterprises by the operator of the central platform 120.

The first enterprise may be associated with many other computing devices 115, some of which may be registered with the first communication network 105. In such a case, the attribution of data usage may be similar to that described above. Some of these computing devices 115, however, may be registered with other networks, such as the second communication network 110. For example, the second network 110 may be the home network for a second computing device 115 that is associated with the first enterprise. When a user initiates a data session request through an application/program installed on the second device 115 that is associated with the first enterprise, such as a secure application, the session request may be redirected to the accounting server 180 via the second network 110, similar to the process above. The data session can be zero-rated, and usage charges for the session can be attributed to the first enterprise. The reports that are generated may show data usage for any managed device 115 on any particular network. As such, enterprise data usage accounting for different computing devices operating on different networks may be realized in this arrangement. That is, a single record may be constructed for an enterprise that shows data usage for all the computing devices 115 associated with the enterprise that operate over multiple networks, such as those managed by different wireless carriers.

In view of this solution, a first enterprise may register with the central platform 120, and any number of its managed devices 115 may be configured to direct data sessions to the accounting server 180 to segregate data usage charges attributable to it from those that are the responsibility of the user of the device 115. This arrangement can ensure that the user of the device 115 is not charged for data sessions that originate from applications/programs that are used on behalf of the enterprise. In addition, any number of enterprises may register for this program, and the enterprises are relieved of having to establish split-billing arrangements with all the operators of the communication networks on which their managed devices 115 may operate.

In some instances, a computing device 115 may operate on a roaming communication network. As mentioned above, the accounting server 180 can identify the communication network handling the data session request, and this information may be provided to the attribution server 185. In one embodiment, the management server 125 may include a database that identifies the home networks of the computing devices 115 that it manages. This feature can allow the attribution server 185 to determine when a data session for a particular computing device 115 was conducted over a roaming network. Alternatively, the computing device 115 can directly inform the accounting server 180 that the data session that the device 115 is requesting is to be conducted over a roaming network, such as through information in the certificate. In either case, the usage charges that may apply to a roaming network may be different in comparison to those incurred through a home network, typically being more expensive. As such, the reports generated by the attribution server 185 for the enterprises may indicate the use of a roaming network by the computing devices 115 and the accompanying (potentially adjusted) usage charges.

Other factors may vary usage charges, and they may be taken into account in this process. For example, the time of day or the market in which a computing device 115 is operating (home or roaming network) may lead to fluctuations in billing rates. If such factors do lead to such variations, they may be identified in the reports that are generated for the relevant enterprises.

In one arrangement, data sessions may be shared among various authorized applications, such as secure applications or other applications approved by the enterprise. For example, state information related to one session may be stored in a secure memory location when a data session is terminated for a first application, and this information may be accessed by a second (authorized) application and used for a subsequent data session. As a more specific example, information related to the handshaking to establish the connection between the original requesting application and the accounting server 180, including keying material, may be recorded and made available to another application through which another data session is being requested. In one embodiment, a grace period may be set, and applications seeking to establish a data session through the accounting server 180 may only access the saved information during the grace period. Following the expiration of the grace period, the saved information may be wiped from storage. This process can be repeated for any number of subsequent data sessions. Of course, this feature may be disabled or not implemented at all, depending on whether and to what extent inter-application communications are desired on the computing device 115.

While various embodiments have been described above, it should be understood that they have been presented by way of example only, and not limitation. It will be understood by those skilled in the relevant art(s) that various changes in form and details may be made therein without departing from the spirit and scope of the subject matter as defined in the appended claims. Accordingly, the breadth and scope of the present subject matter should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method for data usage accounting across multiple communication networks, comprising:
    receiving a first enterprise data session request from a first computing device that is configured to operate on a first home communication network, wherein the first computing device is associated with a first enterprise and the first enterprise data session request includes a location of a first requested external entity;
    in response to the received first enterprise data session request, establishing a connection with the first requested external entity based on the location of the first requested external entity for data exchange between the first computing device and the first requested external entity;
    determining a data usage amount for the data exchange of the first enterprise data session request;
    determining that the first computing device is associated with the first enterprise;
    attributing the data usage amount for the data exchange of the first enterprise data session request to the first enterprise;
    receiving a second enterprise data session request from a second computing device that is configured to operate on a second home communication network, wherein the second computing device is also associated with the first enterprise and the second enterprise data session request includes a location of a second requested external entity;
    in response to the received second enterprise data session request, establishing a connection with the second requested external entity based on the location of the second requested external entity for data exchange between the second computing device and the second requested external entity;
    determining a data usage amount for the data exchange of the second enterprise data session request from the second computing device;
    determining that the second computing device is associated with the first enterprise; and
    attributing the data usage amount for the data exchange of the second enterprise data session request from the second computing device to the first enterprise such that enterprise data usage accounting for different computing devices operating on different networks is enabled.

2. The method according to claim 1, wherein receiving the first enterprise data session request from the first computing device comprises receiving the first enterprise data session from the first computing device over the first home communication network and receiving the second enterprise data session request from the second computing device comprises receiving the second enterprise data session from the second computing device over the second home communication network.

3. The method according to claim 1, wherein receiving the first enterprise data session request from the first computing device comprises receiving the first enterprise data session from the first computing device over a roaming communication network and receiving the second enterprise data session request from the second computing device comprises receiving the second enterprise data session from the second computing device over a roaming communication network.

4. The method according to claim 1, wherein the first enterprise data session request received from the first computing device is a redirected data session request originating from a secure application installed on the first computing device.

5. The method according to claim 1, further comprising receiving another enterprise data session request from a third computing device that is configured to operate on the second home communication network, wherein the third computing device is associated with a second enterprise;
  determining a data usage amount for the enterprise data session request from the third computing device;
  determining that the third computing device is associated with the second enterprise; and
  attributing the data usage amount for the enterprise data session request from the third computing device to the second enterprise.

6. The method according to claim 1, wherein attributing the data usage amount for the first enterprise data session request from the first computing device to the first enterprise comprises accessing a predetermined usage rate for the first enterprise based on the first home communication network.

7. The method according to claim 1, wherein the first enterprise data session request received from the first computing device is a zero-rated data session request such that an end user of the first computing device is not responsible for the data usage from the data session request.

8. A system for data usage accounting across multiple communication networks, comprising:
  an accounting server and an attribution server communicatively coupled to the accounting server, wherein the accounting server is configured to:
    receive a first enterprise data session request from a first computing device that is configured to operate on a first home communication network, wherein the first computing device is associated with a first enterprise and the first enterprise data session request includes a location of a first requested external entity;
    in response to the received first enterprise data session request, establish a connection with the first requested external entity based on the location of the first requested external entity for data exchange between the first computing device and the first requested external entity;
    determine a data usage amount for the data exchange of the first enterprise data session request;
    determine that the first computing device is associated with the first enterprise;
    receive a second enterprise data session request from a second computing device that is configured to operate on a second home communication network, wherein the second computing device is also associated with the first enterprise and the second enterprise data session request includes a location of a second requested external entity;
    in response to the received second enterprise data session request, establish a connection with the second requested external entity based on the location of the second requested external entity for data exchange between the second computing device and the second requested external entity;
    determine a data usage amount for the data exchange of the second enterprise data session request from the second computing device; and
    determine that the second computing device is associated with the first enterprise
  wherein the attribution server is configured to:
    attribute the data usage amount for the data exchange of the first enterprise data session request to the first enterprise; and
    attribute the data usage amount for the data exchange of the second enterprise data session request from the second computing device to the first enterprise such that enterprise data usage accounting for different computing devices operating on different networks is enabled.

9. The system according to claim 8, wherein the accounting server is further configured to receive the first enterprise data session request from the first computing device by receiving the first enterprise data session from the first computing device over the first home communication network and is further configured to receive the second enterprise data session request from the second computing device by receiving the second enterprise data session from the second computing device over the second home communication network.

10. The system according to claim 8, wherein the accounting server is further configured to receive the first enterprise data session request from the first computing device by receiving the first enterprise data session from the first computing device over a roaming communication network and is further configured to receive the second enterprise data session request from the second computing device by receiving the second enterprise data session from the second computing device over a roaming communication network.

11. The system according to claim 8, wherein the first enterprise data session request that the accounting server is configured to receive from the first computing device is a redirected data session request originating from a secure application installed on the first computing device.

12. The system according to claim 8, wherein the accounting server is further configured to:
  receive another enterprise data session request from a third computing device that is configured to operate on the second home communication network, wherein the third computing device is associated with a second enterprise;
  determine a data usage amount for the enterprise data session request from the third computing device; and
  determine that the third computing device is associated with the second enterprise;
  wherein the attribution server is further configured to attribute the data usage amount for the enterprise data session request from the third computing device to the second enterprise.

13. The system according to claim 8, wherein the attribution server is further configured to attribute the data usage amount for the first enterprise data session request from the first computing device to the first enterprise by accessing a predetermined usage rate for the first enterprise based on the first home communication network.

14. The system according to claim 8, wherein the first enterprise data session request that the accounting server is configured to receive from the first computing device is a zero-rated data session request such that an end user of the first computing device is not responsible for the data usage from the data session request.

* * * * *